(12) United States Patent
Mao et al.

(10) Patent No.: US 12,027,932 B2
(45) Date of Patent: Jul. 2, 2024

(54) STATOR ASSEMBLY, MOTOR, COMPRESSOR, AND REFRIGERATION DEVICE

(71) Applicant: ANHUI MEIZHI PRECISION MANUFACTURING CO., LTD., Anhui (CN)

(72) Inventors: Linshu Mao, Anhui (CN); Xiaohua Qiu, Anhui (CN); Ruming Xie, Anhui (CN); Yulong Wang, Anhui (CN)

(73) Assignee: ANHUI MEIZHI PRECISION MANUFACTURING CO., LTD., Anhui (CN)

(*) Notice: Subject to any disclaimer, the term of this patent is extended or adjusted under 35 U.S.C. 154(b) by 332 days.

(21) Appl. No.: 17/532,231

(22) Filed: Nov. 22, 2021

(65) Prior Publication Data

US 2022/0085679 A1 Mar. 17, 2022

Related U.S. Application Data

(63) Continuation of application No. PCT/CN2019/108182, filed on Sep. 26, 2019.

(30) Foreign Application Priority Data

Aug. 26, 2019 (CN) .......................... 201910792849.X

(51) Int. Cl.
*H02K 3/28* (2006.01)
*H02K 1/14* (2006.01)
(Continued)

(52) U.S. Cl.
CPC ............... *H02K 3/28* (2013.01); *H02K 1/145* (2013.01); *H02K 1/276* (2013.01); *H02K 3/34* (2013.01)

(58) Field of Classification Search
CPC .......... H02K 3/28; H02K 1/145; H02K 1/276; H02K 3/34; H02K 3/522; H02K 2203/12;
(Continued)

(56) References Cited

U.S. PATENT DOCUMENTS 4,127,787 A * 11/1978 Auinger ................. H02K 17/14
318/773
2011/0014068 A1* 1/2011 Tsukamoto ............. H02K 3/28
310/215

(Continued)

FOREIGN PATENT DOCUMENTS

| CN | 1918775 A | 2/2007 |
| CN | 101752926 A | 6/2010 |

(Continued)

OTHER PUBLICATIONS

Extended European Search Report dated May 10, 2022 received in European Patent Application No. EP 19942957.2.

(Continued)

*Primary Examiner* — Ahmed Elnakib
(74) *Attorney, Agent, or Firm* — Scully, Scott, Murphy & Presser, P.C.

(57) ABSTRACT

A stator assembly, a motor, a compressor and a refrigeration device are provided. The stator assembly has a store core, tooth parts, and windings. The tooth parts are arranged on an inside wall of the stator core and distributed in a circumferential direction of the stator core. Grooves are defined between every two adjacent tooth parts. The tooth parts have a first tooth. The windings are arranged on the tooth parts by being initially wound on the first tooth and, subsequently passing through the grooves on both sides of the first tooth when being wound on other tooth parts.

11 Claims, 3 Drawing Sheets

(51) Int. Cl.
*H02K 1/276* (2022.01)
*H02K 3/34* (2006.01)
(58) Field of Classification Search
CPC ......... H02K 7/14; F04B 27/053; F04B 35/01; F04B 39/0094; F04B 35/04; F25B 31/02
USPC ........................................................ 310/198
See application file for complete search history.

(56) References Cited

U.S. PATENT DOCUMENTS

| | | | |
|---|---|---|---|
| 2011/0241472 | A1 | 10/2011 | Tanaka et al. |
| 2013/0257216 | A1* | 10/2013 | Park .................. H02K 3/28 310/208 |
| 2016/0352170 | A1 | 12/2016 | Wang et al. |
| 2018/0166932 | A1 | 6/2018 | Desai |
| 2019/0036406 | A1* | 1/2019 | Nakahara ................. H02K 3/04 |
| 2019/0199156 | A1 | 6/2019 | Bernreuther et al. |

FOREIGN PATENT DOCUMENTS

| | | |
|---|---|---|
| CN | 105515246 A | 4/2016 |
| CN | 206041669 U | 3/2017 |
| CN | 106787337 A | 5/2017 |
| CN | 206313550 U | 7/2017 |
| CN | 107070016 A | 8/2017 |
| CN | 107112836 A | 8/2017 |
| CN | 107112839 A | 8/2017 |
| CN | 107251410 A | 10/2017 |
| CN | 108880018 A | 11/2018 |
| CN | 208638125 U | 3/2019 |
| JP | 51-140104 A | 12/1976 |
| JP | 60-148347 A | 8/1985 |
| JP | 07-298596 A | 11/1995 |
| JP | 2002-305861 A | 10/2002 |
| SU | 1444906 A1 | 12/1988 |
| WO | 2011099567 A1 | 8/2011 |
| WO | 2018/218899 A1 | 12/2018 |

OTHER PUBLICATIONS

Wu, C., "Principles of Repairing Electrical Windings", Electrical Manufacturing, Feb. 25, 2013, pp. 73-77, vol. 2 together with an English language abstract.

International Search Report dated May 26, 2020 received in International Application No. PCT/CN2019/108182 together with an English language translation.

First Office Action dated Jun. 25, 2021 received in Chinese Patent Application No. Cn 201910792849.X together with an English language translation.

Office Action dated May 19, 2022 received in Indian Patent Application No. IN 202147053956.

Notice of Reasons for Refusal dated Nov. 29, 2022 received in Japanese Patent Application No. JP 2021-570205.

Office Action dated Jan. 16, 2023 received in Canadian Patent Application No. CA 3,139,847.

Request for the Submission of an Opinion dated May 30, 2023 received in Korean Patent Application No. KR 10-2021-7038183.

* cited by examiner

STATOR ASSEMBLY, MOTOR, COMPRESSOR, AND REFRIGERATION DEVICE

CROSS-REFERENCE TO RELATED APPLICATIONS

The present application is a continuation application of PCT International Application No. PCT/CN2019/108182, filed on Sep. 26, 2019, which claims priority to and benefits of Chinese Patent Application No. 201910792849.X filed with China National Intellectual Property Administration on Aug. 26, 2019 and entitled "Stator assembly, Motor, Compressor, and Refrigeration Device", the entire contents of which are incorporated herein by reference for all purposes. No new matter has been introduced.

FIELD

The present disclosure relates to the technical field of compressors, and in particular to a stator assembly, a motor, a compressor and a refrigeration device.

BACKGROUND

At present, a motor of a large displacement compressor has a large wire diameter and is relatively difficult to manufacture. In order to address this issue, parallel connection is adopted to generally reduce the wire diameter. However, for a motor with even larger power, the wire diameter is further increased, and the parallel connection cannot meet the manufacturing requirement. Thus, a delta connection is considered. However, when the delta connection adopts the parallel connection, a large number of thread ends are provided and distributed randomly, which renders wiring, subsequent processing, and product manufacturing difficult, thereby seriously affecting the manufacturing efficiency. If the parallel connection is modified into a series connection, the wire diameter is overly large, which prevents achieving a high filling ratio, thereby affecting the motor efficiency.

SUMMARY

The present disclosure aims to solve at least one of technical problems existing in the prior art or relevant technologies.

To this end, the first aspect of the present disclosure provides a stator assembly.

A second aspect of the present disclosure also provides a motor.

A third aspect of the present disclosure also provides a compressor.

A fourth aspect of the present disclosure also provides a refrigeration device.

In view of this, the first aspect of the present disclosure provides a stator assembly. The stator assembly comprises a stator core, a plurality of tooth parts, and a plurality of windings. The plurality of tooth parts are arranged on an inside wall of the stator core and distributed in a circumferential direction of the stator core. Grooves are defined between the adjacent tooth parts. The tooth part comprises at least one first tooth. The windings are arranged on the tooth parts. The windings are initially wound on one of the at least one first tooth, and pass through the grooves at both sides of the one of the at least one first tooth when being wound on other tooth parts.

The stator assembly provided by the present disclosure comprises the stator core and the plurality of tooth parts arranged on the inside wall of the stator core, the windings are wound on the tooth part to form a coil, and a magnetic field is generated when the coil powers on. When the windings are wound, the windings are wound from the first tooth. One winding is wound on the plurality of tooth parts, and after the windings are wound on the first tooth completely, the windings pass through the crossover lines of the grooves on both sides of the first tooth when winding other tooth parts. On the one hand, the windings pass through the crossover lines of the grooves on both sides of the first tooth before winding other tooth parts, so that the crossover lines of one winding are concentrated in a region, i.e., concentrated in the grooves on both sides of the first tooth, and then, a tap is led out from the grooves on both sides of the first tooth, so that the tap is concentrated in a region, thereby facilitating the connection and linking with other components when leading out the wire. On the other hand, the coils on the plurality of tooth parts are wound by a winding, so as to avoid too loose coils. Meanwhile, crossover lines at the end of the stator core are reduced by the crossover lines of the grooves on both sides of the first tooth, and thus, the height thereof is reduced.

According to the stator assembly provided by the present disclosure, the stator assembly can also have the following additional technical features.

In the above embodiment, the windings comprise a first winding, a second winding and a third winding; the plurality of tooth parts form a plurality of tooth part groups; the first winding, the second winding and the third winding are respectively wound on the corresponding tooth part groups; any one of the plurality of tooth part groups comprises a first tooth, and the first teeth in the plurality of tooth part groups are arranged adjacently; and wherein, after a winding of the crossover line in the groove located at a starting end of the first winding is cut off, a first tap is led out from the starting end of the first winding and an end of the second winding; after the winding of the crossover line in the groove located at a starting end of the second winding is cut off, a second tap is led out from the starting end of the second winding and an end of the third winding; and after the winding of the crossover line in the groove located at a starting end of the third winding is cut off, a third tap is led out from the starting end of the third winding and an end of the first winding.

In this embodiment, the windings comprise the first winding, the second winding and the third winding, so that the first winding, the second winding and the third winding form a three-phase winding, wherein the plurality of tooth parts could form a plurality of tooth part groups. The first winding, the second winding and the third winding respectively correspond to a tooth part group, so that the first winding, the second winding and the third winding are respectively wound on the corresponding tooth part groups; and each of the plurality of tooth part groups comprises a first tooth, so that crossover lines of the first winding, the second winding and the third winding are concentrated on the first tooth in the three corresponding tooth part groups, and as the first tooth of each tooth part group is arranged adjacently, the crossover lines of the grooves of the first winding, the second winding and the third winding are concentrated in one region, that is, concentrated in the grooves on both sides of the first tooth of each tooth part group, thus, a part of winding tap of the same phase is concentrated in the same region. For example, after the coils on all tooth parts in the tooth part groups corresponding to the windings are wound completely, lines that pass through the grooves on both sides of the first tooth in the tooth part group corresponding to the first winding in a crossover line manner is cut off, and the first tap is led out from the starting end of the first winding and the end of the second winding. Similarly, lines that pass through the grooves on both sides of the first tooth in the tooth part group corresponding to the second winding in a crossover line manner is cut off, and the second tap is led out from the starting end of the second winding and the end of the third winding; and lines that pass through the grooves on both sides of the first tooth in the tooth part group corresponding to the third winding in a crossover line manner is cut off, and the third tap is led out from the starting end of the third winding and the end of the first winding. The three taps are connected with an external power supply to power on the coils, while ensuring that the tap for connecting the motor is fixed by a wire wrapping force, thereby preventing the lead wire from being too loose.

In any one of the above embodiments, the groove comprises a first groove and a second groove located on both sides of the tooth part in a circumferential direction of the stator core, the tooth part group further comprises a second tooth and a third tooth, the second teeth in the plurality of tooth part groups are arranged adjacently, and the third teeth in the plurality of tooth part groups are arranged adjacently; and wherein the first winding, the second winding and the third winding are wound from the first groove of the corresponding first tooth and form coils on the first tooth, then are wound on the second tooth after lines cross the first groove of the first tooth to form the coils, and are wound on the third tooth by successively passing through crossover lines of the second groove of the first tooth and the first groove of the first tooth after lines cross the end of the second tooth to form the coil, wherein the windings are wound from the second groove of the third tooth and led out by the second groove of the third tooth.

In this embodiment, the tooth part group comprises the first tooth, the second tooth and the third tooth, and the windings corresponding to each of the tooth part groups are respectively wound on the first tooth, the second tooth and the third tooth. For example, the first winding, the second winding and the third winding are wound from the first tooth in the corresponding tooth part groups; after specified turns are wound on the first tooth, the lines cross the first groove of the first tooth to wind the second tooth; and after specified turns are wound on the second tooth, the lines cross from the end of the second tooth to the first tooth, and are led to the third tooth after the second groove of the first tooth and the first groove of the first tooth pass through the lines successively to wind the specified turns on the third tooth. The first winding, the second winding and the third winding are wound in the same way.

In any one of the above embodiments, the first winding, the second winding and the third winding have the same plurality of coil turns.

In this embodiment, the first winding is wound on the plurality of tooth parts, the plurality of tooth parts have the same coil turns, and the coils that the first winding, the second winding and the third winding are respectively wound on the tooth parts have the same turns, so that the first winding, the second winding and the third winding have the same inductance.

In any one of the above embodiments, the plurality of coils of the first winding, the second winding and the third winding are uniformly distributed in the circumferential direction of the stator core; and the plurality of coils of the first winding, the second winding and the third winding are successively arranged at intervals.

In this embodiment, each winding is wound on the plurality of tooth parts to form a plurality of coils. For example, a plurality of coils of the first winding, the second winding and the third winding are uniformly distributed in the circumferential direction of the stator core, and arranged apart from each other, so that the magnetic fields generated by the first winding, the second winding and the third winding are more balanced.

In any one of the above embodiments, the first tap, the second tap and the third tap are located at the same end of the stator core.

In this embodiment, the first tap, the second tap and the third tap are located at the same end of the stator core, and thus, concentrated in a region, which facilitates connection and subsequent processing.

In any one of the above embodiments, the stator assembly further comprises: an insulation skeleton, being arranged at the end of the stator core, wherein the winding is adapted to be wound on the insulation skeleton, so that the winding crosses a line at the end of the stator core.

In this embodiment, the stator assembly further comprises an insulation skeleton, being arranged at the end of the stator core. When the winding winds a tooth part and then is led to another tooth part, lines should cross the end of the stator core. To avoid multiphase windings from contacting, lines could cross the insulation skeleton, that is, when lines cross the end, the lines are fixed on the insulation skeleton, which could separate the windings of each phase, and also make the crossover line of the end cleaner.

In any one of the above embodiments, the first winding, the second winding and the third winding are arranged in parallel.

In this embodiment, the first winding, the second winding and the third winding are arranged in parallel.

The second aspect of the present disclosure further provides a motor, comprising: the stator assembly according to any one of the embodiments.

The motor provided by the second aspect of the present disclosure comprises the stator assembly according to any one of the embodiments, and thus, has all beneficial effects of the stator assembly.

In the above embodiment, the motor further comprises a rotor assembly which is rotatably connected with the stator assembly, the rotor assembly comprises a rotor core and a permanent magnet, a permanent magnet slot is arranged on the rotor core, and the permanent magnet is arranged in the permanent magnet slot.

In this embodiment, the motor further comprises the rotor assembly arranged in the stator core, and the stator assembly is surrounded outside the rotor assembly, wherein the rotor assembly comprises the rotor core, a plurality of permanent magnet slots are formed on the rotor core and distributed in a circumferential direction of the rotor core, and the permanent magnet is arranged in the permanent magnet slot.

For example, the stator assembly is rotatably connected with the rotor assembly.

The third aspect of the present disclosure further provides a compressor, comprising: the stator assembly according to any one of the embodiments of the first aspect; or the motor according to any one of the embodiments of the second aspect.

The compressor provided by the third aspect of the present disclosure comprises the stator assembly according to any one of the embodiments of the first aspect, or the motor according to any one of the embodiments of the second aspect, and thus, has all beneficial effects of the stator assembly or the motor.

The fourth aspect of the present disclosure further provides a refrigeration device, comprising: the stator assembly according to any one of the embodiments of the first aspect; or the motor according to any one of the embodiments of the second aspect; or the compressor according to any one of the embodiments of the third aspect.

The refrigeration device provided by the fourth aspect of the present disclosure comprises the stator assembly according to any one of the embodiments of the first aspect; or the motor according to any one of the embodiments of the second aspect; or the compressor according to any one of the embodiments of the third aspect, and thus, has all beneficial effects of the stator assembly or the motor or the compressor.

Additional aspects and advantages of the present disclosure will be apparent from the following description, or may be learned by practice of the present disclosure.

BRIEF DESCRIPTION OF THE DRAWINGS

The above and/or additional aspects and advantages of the present disclosure will become obvious and easy to understand from the description of the embodiments in conjunction with the following drawings, wherein.

Figure 1:
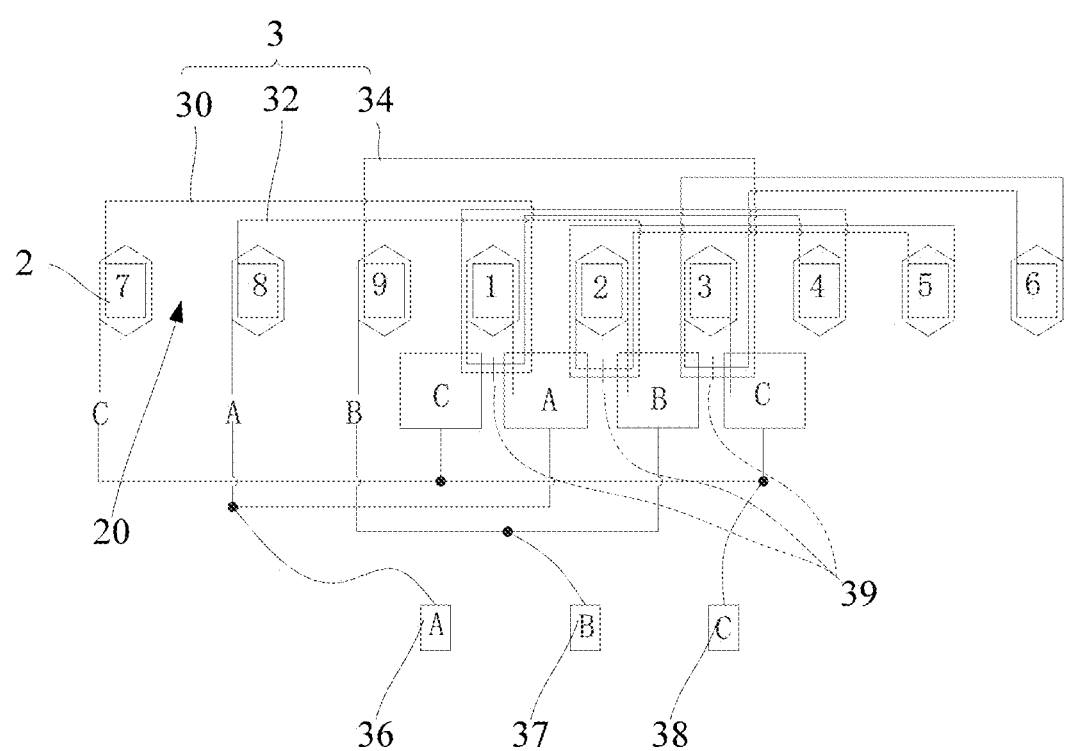
FIG. 1 is a schematic diagram illustrating wire wrapping of a winding in an embodiment of the present disclosure.

The reference numerals and the names of the components designated by these reference numerals, respectively, are described as follows:

100 motor, 1 stator assembly, 2 tooth part, 20 groove, 3 winding, 30 first winding, 32 second winding, 34 third winding, 36 first tap, 37 second tap, 38 third tap, 39 off position, 4 insulation skeleton, 5 lead wire, 6 frequency converter, 7 rotor assembly, 8 compression component, 80 crankshaft, 82 main bearing, 84 air cylinder, 86 supplementary bearing, 88 piston.

DETAILED DESCRIPTION OF EMBODIMENTS

In order that the above objects, features, and advantages of the present disclosure may be more clearly understood, the present disclosure will be described in further detail with reference to the accompanying drawings and preferred embodiments. It should be noted that the embodiments and features in the embodiments of the present disclosure may be combined with one another without conflict.

In the following description, many specific details are set forth in order to fully understand the present disclosure. However, the present disclosure can also be implemented in other ways different from those described herein. Therefore, the scope of the present disclosure is not limited by specific embodiments disclosed below.

A stator assembly, a motor 100, a compressor and a refrigeration device according to some embodiments of the present disclosure are described below with reference to FIGS. 1 to 5.

Figure 2:
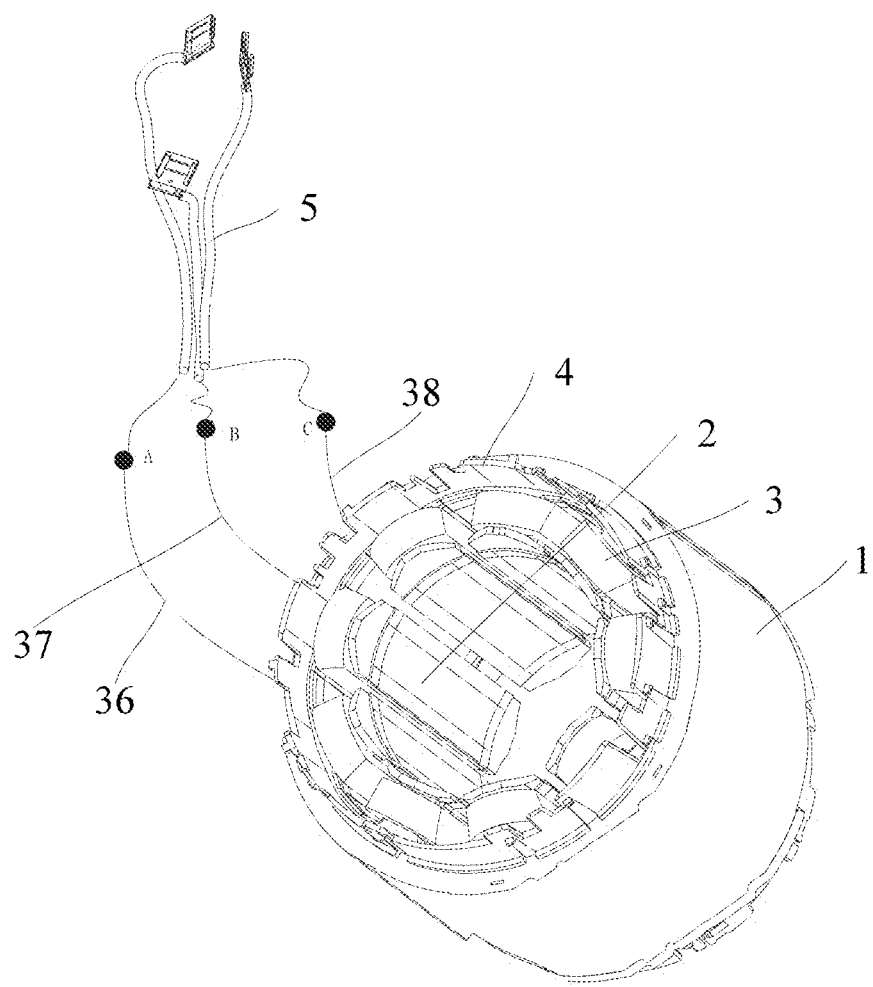
FIG. 2 is a schematic diagram illustrating a structure of a stator assembly in an embodiment of the present disclosure.

As shown in FIGS. 1 and 2, according to an embodiment of the first aspect of the present disclosure, the present disclosure provides a stator assembly, comprising: a stator core 1, a plurality of tooth parts 2 and windings 3.

For example, the plurality of tooth parts 2 are arranged on the inside wall of the stator core 1 and distributed in a circumferential direction of the stator core 1. Grooves 20 are defined between the adjacent tooth parts 2, and the windings 3 are wound on the tooth part 2. For example, the windings 3 are wound on the tooth part 2 through the grooves 20 on both sides of the tooth part 2, so that a portion of the windings 3 are located in the grooves 20 on both sides of the tooth part 2. The tooth part 2 comprises a first tooth, the windings 3 are initially wound to the first tooth, and the windings 3 pass through the grooves 20 on both sides of the first tooth when being wound to other tooth parts 2 after wound to the first tooth.

The stator assembly provided by the present disclosure comprises the stator core 1 and the plurality of tooth parts 2 arranged on the inside wall of the stator core 1. The windings 3 are wound on the tooth part 2 to form a coil, and a magnetic field is generated when the coil is powered on. When the windings 3 are wound, the windings 3 are wound from the first tooth. One winding 3 is wound on the plurality of tooth parts 2, and after windings 3 are wound on the first tooth completely, the windings pass through the crossover lines of the grooves 20 on both sides of the first tooth when winding other tooth parts 2. On the one hand, the windings 3 pass through the crossover lines of the grooves parts 20 on both sides of the first tooth before winding other tooth parts 2, so that the crossover lines of one winding 3 are concentrated in a region, i.e., concentrated in the grooves 20 on both sides of the first tooth, and then, a tap is led out from the grooves 20 on both sides of the first tooth, so that the tap is concentrated in a region, thereby facilitating the connection and linking with other components when leading out the wire. On the other hand, the coils on the plurality of tooth parts 2 are wound by a winding 3, so as to avoid overly loose coils. Meanwhile, crossover lines at the end of the stator core 1 are reduced by the crossover lines of the grooves 20 on both sides of the first tooth, and thus, the height of the stator core 1 is reduced.

For example, the winding 3 is wound on the first tooth to form a coil and then is wound on the second tooth, and at this time, the crossover lines of the grooves 20 on both sides of the first tooth should be passed. When winding the third tooth after winding the second tooth, the winding 3 is also led to the grooves 20 on both sides of the first tooth by the second tooth, and is wound on the third tooth after passing through the grooves 20 on both sides of the first tooth.

It could be understood that, when the winding 3 is wound on one tooth part 2 and then on the other tooth part 2, the process of leading from one tooth part 2 to the other tooth part 2 is called crossover. The crossover line that passes through the grooves 20 on both sides of the first tooth is passed by the grooves 20 on both sides of the first tooth when the winding 3 is led by one tooth part 2 to the other tooth part 2, and is the line crossing the line of the grooves 20 on both sides of the first tooth; and the crossover line that passes through the end of the stator core 1 is the line crossing the end of the stator core 1 when the winding 3 is led by one tooth part 2 to the other tooth part 2.

In addition to the feature defined by any of the embodiments, one embodiment of the present disclosure further defines that: the winding 3 comprises a first winding 30, a second winding 32 and a third winding 34; the plurality of tooth parts 2 form a plurality of tooth part groups; the first winding 30, the second winding 32 and the third winding 34 are respectively wound on the corresponding tooth part groups; any one of the plurality of tooth part groups comprises a first tooth; and the first teeth in the plurality of tooth part groups are arranged adjacently.

For example, after the winding 3 is wound completely, the tap of the winding 3 should be led out to be connected with other components. The windings 3 pass through the crossover lines of the grooves 20 on both sides of the first tooth, so that the crossover line of the winding 3 is concentrated in the grooves 20 on both sides of the first tooth, and then, the line crossed in the grooves 20 on both sides of the first tooth is cut off and the tap is led out. After the winding 3 of the crossover line in the groove 20 located at a starting end of the first winding 30 is cut off, a first tap 36 is led out from the starting end of the first winding 30 and an end of the second winding 32; after the winding 3 of the crossover line in the groove 20 located at a starting end of the second winding 32 is cut off, a second tap 37 is led out from the starting end of the second winding 32 and an end of the third winding 34; and after the winding 3 of the crossover line in the groove 20 located at a starting end of the third winding 34 is cut off, a third tap 38 is led out from the starting end of the third winding 34 and an end of the first winding 30.

In this embodiment, as shown in FIG. 1, the location shown by the dashed line is an off position 39. After the coils on all tooth parts 2 in the tooth part groups corresponding to the windings 3 are wound completely, lines that pass through the grooves 20 on both sides of the first tooth in the tooth part group corresponding to the first winding 30 in a crossover line manner are cut off, and the first tap 36 is led out from the starting end of the first winding 30 and the end of the second winding 32. Similarly, lines that pass through the grooves 20 on both sides of the first tooth in the tooth part group corresponding to the second winding 32 in a crossover line manner are cut off, and the second tap 37 is led out from the starting end of the second winding 32 and the end of the third winding 34; and lines that pass through the grooves 20 on both sides of the first tooth in the tooth part group corresponding to the third winding 34 in a crossover line manner are cut off, and the third tap 38 is led out from the starting end of the third winding 34 and the end of the first winding 30. The three taps are connected with an external power supply to power on the coils, while ensuring that the tap for connecting the motor 100 is fixed by a wire wrapping force, thereby preventing the lead wire from being overly loose.

For example, as shown in FIG. 1, the number of the tooth part groups is three, and the three tooth part groups are arranged to correspond to the three windings 3. That is, the three windings 3 are respectively wound on the three tooth part groups. The three tooth parts 2 marked as 1, 4 and 7 on the tooth part 2 are a tooth part group, and the tooth marked as 1 on the tooth part 2 is the first tooth in the tooth part group; the three tooth parts 2 marked as 2, 5 and 8 on the tooth part 2 are a tooth part group, and the tooth marked as 2 on the tooth part 2 is the first tooth in the tooth part group; and the three tooth parts 2 marked as 3, 6 and 9 on the tooth part 2 are a tooth part group, and the tooth part 2 marked as 3 on the tooth part 2 is the first tooth in the tooth part group. The first winding 30, the second winding 32 and the third winding 34 respectively pass through the crossover lines on both sides of the three tooth parts 2 marked as 1, 2 and 3, so that the crossover lines are concentrated in the grooves 20 on both sides of the three tooth parts 2 marked as 1, 2 and 3. Lines that pass through the grooves 20 on both sides of the first tooth in a crossover line manner are cut off at the three off positions 39, so that an A group of wires are formed between the two tooth parts 2 marked as 1 and 2, a B group of wires are formed between the two tooth parts 2 marked as 2 and 3, and a C group of wires are formed between the two tooth parts 2 marked as 3 and 4. Meanwhile, the winding 3 at one side of the tooth part 2 marked as 8, i.e., another A group of wires are formed at the end of the second winding 32, the winding 3 at one side of the tooth part 2 marked as 9, i.e., another B group of wires are formed at the end of the third winding 34, the winding 3 at one side of the tooth part 2 marked as 7, i.e., another C group of wires are formed at the end of the first winding 30, lead out the first tap 36 of the two A groups of wires, the second tap 37 of the two B groups of wires, and the third tap 38 of the two C groups of wires.

According to any one of the embodiments of the present disclosure, in addition to the feature defined by any one of the above embodiments, further defines that: the groove 20 comprises a first groove and a second groove located on both sides of the tooth part 2 in a circumferential direction of the stator core 1, the tooth part group further comprises a second tooth and a third tooth, the second teeth in the plurality of tooth part groups are arranged adjacently to one another, and the third teeth in the plurality of tooth part groups are arranged adjacently to one another.

For example, the first winding 30, the second winding 32 and the third winding 34 are wound from the first groove of the corresponding first tooth and form the coils on the first tooth, then are wound on the second tooth after lines cross the first groove of the first tooth to form the coils, and are wound on the third tooth by successively passing through the crossover lines of the second groove of the first tooth and the first groove of the first tooth after the lines cross the end of the second tooth to form the coil. The winding 3 is wound from the second groove of the third tooth and led out by the second groove of the third tooth.

In the embodiment, as shown in FIG. 1, by taking the first winding 30 and the tooth part group consisting of the three tooth parts 2 marked as 1, 4 and 7 and corresponding to the first winding 30 as an example, the three tooth parts 2 marked as 1, 4 and 7 are successively the first tooth, the second tooth and the third tooth. A first groove is defined at one side that the tooth part 2 marked as 1 is close to the tooth part 2 marked as 2, and a second groove is defined at one side that the tooth part 2 marked as 1 is close to the tooth part 2 marked as 9. The starting end of the first winding 30 is located in the first groove and wound on the first tooth, and after winding on the first tooth by the specified turns, the winding extends from the second groove of the first tooth and passes through the first groove of the first tooth to wind the second tooth; and after winding on the second tooth by the specified turns, the winding passes through the crossover lines of the grooves 20 on both sides of the first tooth, namely, the first winding 30 is led by the second tooth to the grooves 20 on both sides of the first tooth, passes through the second groove of the first tooth and the first groove of the first tooth successively, then is led by the first groove of the first tooth to the third tooth, and is wound on the third tooth by the specified turns. The second winding 32 and the third winding 34 are wound in the same way as the first winding 30, so no repeated description is made here.

Further, the winding 3 further comprises a fourth tooth, a fifth tooth, etc. Similarly, the winding 3 is wound on the third tooth by the specified turns, then crosses to the grooves 20 on both sides of the first tooth through the end, and is wound on the fourth tooth after passing through the crossover lines of the grooves 20 on both sides of the first tooth.

According to any one of the embodiments of the present disclosure, in addition to the feature defined by any one of the above embodiments, further defines that: the first winding 30 is wound on the plurality of tooth parts 2, the plurality of tooth parts 2 have the same coil turns, and the coils that the first winding 30, the second winding 32 and the third winding 34 are respectively wound on the tooth parts 2 have the same turns, so that the first winding 30, the second winding 32 and the third winding 34 have the same inductance.

According to any one of the embodiments of the present disclosure, in addition to the feature defined by any one of the above embodiments, further defines that: the winding 3 is wound on the plurality of tooth parts 2 to form a plurality of coils. For example, a plurality of coils of the first winding 30, the second winding 32 and the third winding 34 are uniformly distributed in the circumferential direction of the stator core 1, and arranged apart from each other, so that the magnetic fields generated by the first winding 30, the second winding 32 and the third winding 34 are more balanced.

According to any one of the embodiments of the present disclosure, in addition to the feature defined by any one of the above embodiments, further defines that: the first tap 36, the second tap 37 and the third tap 38 are located at the same end of the stator core 1, and thus, concentrated in a region, which facilitates connection and subsequent processing.

Figure 3:
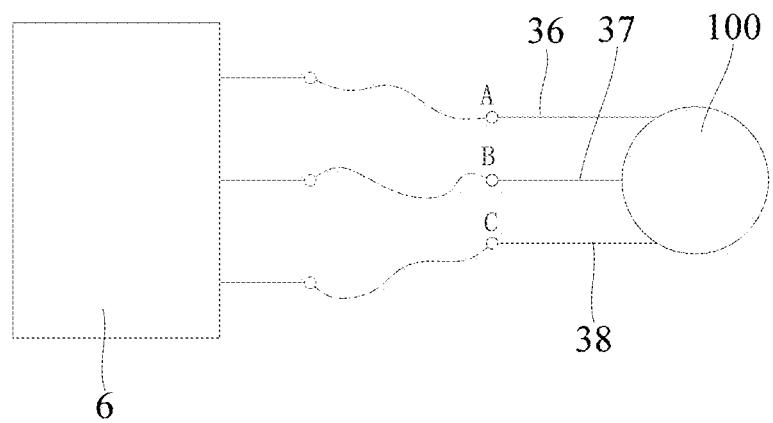
FIG. 3 is a schematic diagram illustrating a structure of connecting a motor with a frequency converter in an embodiment of the present disclosure.

For example, as shown in FIG. 2, the motor 100 further comprises a lead wire 5, wherein the lead wire 5 is connected with the first tap 36, the second tap 37 and the third tap 38 to be connected with other components by the lead wire 5. For example, as shown in FIG. 3, the motor 100 could be connected with the frequency converter 6 through the first tap 36, the second tap 37 and the third tap 38.

According to any one of the embodiments of the present disclosure, in addition to the feature defined by any one of the above embodiments, further defines that: the stator assembly further comprises an insulation skeleton 4, arranged at the end of the stator core 1. When the winding 3 winds a tooth part 2 and then is led to another tooth part 2, lines should cross the end of the stator core 1. To avoid multiphase winding 3 from contacting, lines could cross the insulation skeleton 4, that is, when lines cross the end, the lines are fixed on the insulation skeleton 4, which could separate the winding 3 of each phase, and also make the crossover line of the end cleaner.

For example, the insulation skeleton 4 is made of insulation materials.

According to any one of the embodiments of the present disclosure, in addition to the feature defined by any one of the above embodiments, further defines that: the first winding 30, the second winding 32 and the third winding 34 are arranged in parallel.

For example, the first winding 30, the second winding 32 and the third winding 34 are connected to each other in an angled manner.

According to an exemplary embodiment of the present disclosure, the present disclosure provides a stator assembly, comprising a stator core 1 and a plurality of tooth parts 2 arranged in a circumferential direction of the stator core 1. The plurality of tooth parts 2 form a plurality of tooth part groups. The first winding 30, the second winding 32 and the third winding 34 are respectively wound on the corresponding tooth part groups, wherein each of the plurality of tooth part groups is provided with the first tooth, and the first teeth in the plurality of tooth part groups are arranged adjacently. When winding the winding 3, the winding 3 passes through the crossover lines of the grooves 20 on both sides of the first tooth, so that the first winding 30, the second winding 32 and the third winding 34 are concentrated in the crossover lines on both sides of the first tooth, and then, lead out the taps after cutting off the lines in the grooves 20 on both sides of the first tooth, so that the first tap 36, the second tap 37 and the third tap 38 are concentrated in one region, thereby facilitating the subsequent connection processing. Meanwhile, the embodiment provided by the present disclosure needs no manual arrangement of the crossover lines, which could realize the automation of the wire wrapping, thereby improving the winding speed and shortening the winding time. In addition, in the present disclosure, the coils on the tooth part 2 in the same tooth part group are wound by the same winding 3, and the lines are not cut off while winding, so that the tap could be fastened by the wire wrapping force, which could prevent the lead wire 5 from loosening.

The second aspect of the present disclosure further provides a motor 100, comprising: the stator assembly according to any one of the embodiments.

The motor 100 provided by the second aspect of the present disclosure comprises the stator assembly according to any one of the embodiments, and thus, has all beneficial effects of the stator assembly.

According to any one of the embodiments of the present disclosure, in addition to the feature defined by any one of the above embodiments, further defines that: the motor 100 further comprises a rotor assembly 7 which is rotatably connected with the stator assembly, the rotor assembly 7 comprises a rotor core and a permanent magnet, a permanent magnet slot is arranged on the rotor core, and the permanent magnet is arranged in the permanent magnet slot.

In this embodiment, the motor 100 further comprises the rotor assembly 7 arranged in a stator core 1, and the stator assembly is surrounded outside the rotor assembly 7, wherein the rotor assembly 7 comprises the rotor core, a plurality of permanent magnet slots are formed on the rotor core and distributed in a circumferential direction of the rotor core, and the permanent magnet is arranged in the permanent magnet slot.

For example, the stator assembly is rotatably connected with the rotor assembly 7.

Figure 4:
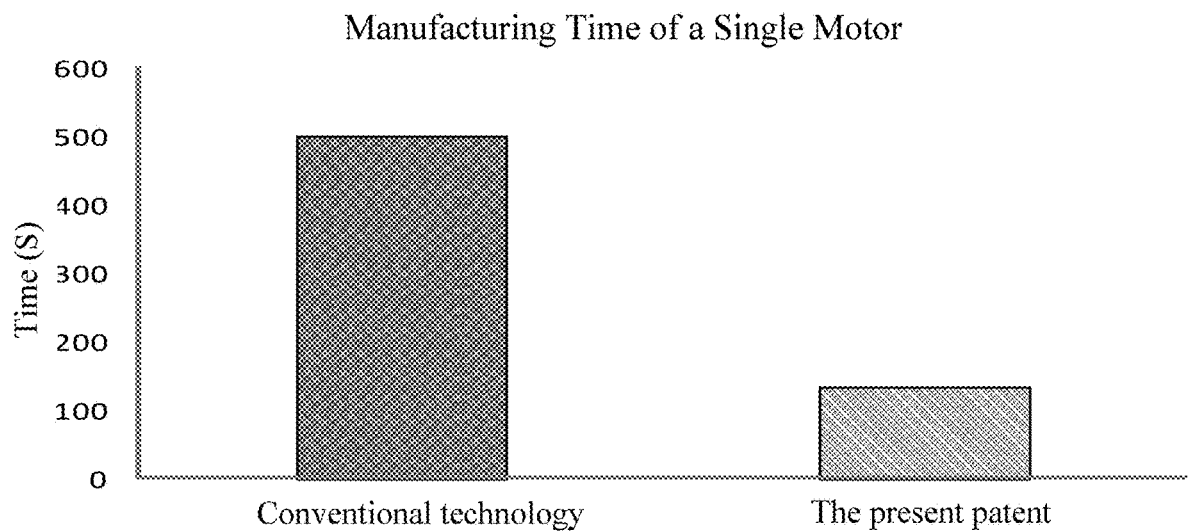
FIG. 4 is a comparison diagram for manufacturing time of a motor in an embodiment of the present disclosure and a motor in relevant technology.

For example, as shown in FIG. 4, the stator assembly in the present disclosure is applied to the motor 100, which improves the manufacturing speed of the motor 100 and shortening the manufacturing time thereof.

Figure 5:
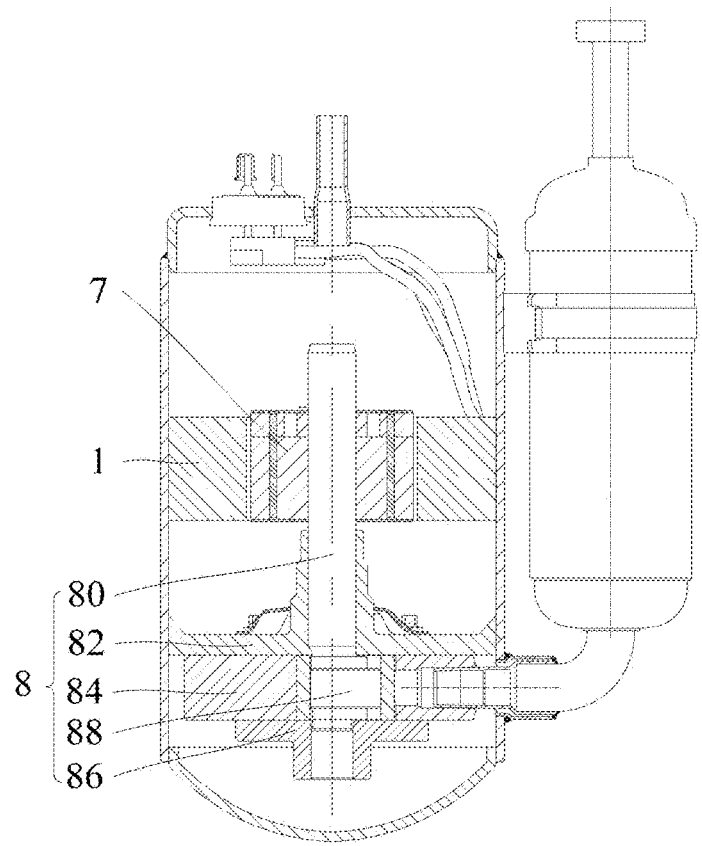
FIG. 5 is a schematic diagram illustrating a structure of a compressor in an embodiment of the present disclosure.

As shown in FIG. 5, the third aspect of the present disclosure further provides a compressor, comprising: the stator assembly according to any one of the embodiments of the first aspect; or the motor 100 according to any one of the embodiments of the second aspect.

The compressor provided by the third aspect of the present disclosure comprises the stator assembly according to any one of the embodiments of the first aspect; or the motor 100 according to any one of the embodiments of the second aspect, and thus, has all beneficial effects of the stator assembly or the motor 100.

For example, as shown in FIG. 5, the compressor further comprises a compression component 8. The compression component 8 comprises an air cylinder 84, a main bearing 82, a supplementary bearing 86, a piston 88 and a crankshaft 80. One end of the crankshaft 80 is inserted in the rotor assembly 7, and the other end thereof successively passes through the main bearing 82, the air cylinder 84 and the supplementary bearing 86; and the piston 88 is arranged in the air cylinder 84.

The fourth aspect of the present disclosure further provides a refrigeration device (not shown in the figures), comprising: the stator assembly according to any one of the embodiments of the first aspect; or the motor 100 according to any one of the embodiments of the second aspect; or the compressor according to any one of the embodiments of the third aspect.

The refrigeration device provided by the fourth aspect of the present disclosure comprises the stator assembly according to any one of the embodiments of the first aspect; or the motor 100 according to any one of the embodiments of the second aspect; or the compressor according to any one of the embodiments of the third aspect, and thus has all beneficial effects of the stator assembly or the motor 100 or the compressor.

In the present disclosure, the term "a plurality of" refers to two or more, unless explicitly defined otherwise. The terms such as "installation", "connected", "connecting", "fixation" and the like shall be understood in broad sense, and for example, "connecting" may be a fixed connection, a detachable connection, or an integral connection; "connected" may be directly connected, or indirectly connected through an intermediary. The specific meaning of the above terms in the present disclosure will be understood by those of ordinary skilled in the art, as the case may be.

In the illustration of the description, the illustration of the terms of "one embodiment", "some embodiments", "specific embodiment", etc. means that the specific features, structures, materials, or characteristics described in conjunction with the embodiments or examples are included in at least one embodiment or example of the present disclosure. In this description, schematic representations of the above terms do not necessarily refer to the same embodiment or example. Moreover, the specific features, structures, materials, or characteristics described may be combined in any suitable manner in any one or more embodiments or examples.

The foregoing is only a preferred embodiment of the present disclosure and is not intended to limit the present disclosure. For those skilled in the art, the present disclosure can have various modifications and changes. Any modifications, equivalents, improvements, etc. that come within the spirit and principle of the present disclosure are intended to be included within the scope of the present disclosure.

What is claimed is:

1. A stator assembly comprising:
a stator core;
a plurality of tooth parts, being arranged on an inside wall of the stator core and distributed in a circumferential direction of the stator core, wherein a plurality of grooves are defined between every two adjacent tooth parts, and the plurality of tooth parts comprise at least one first tooth, at least one second tooth and at least one third tooth; and
windings arranged on the plurality of tooth parts,
wherein each of the windings is wound on one of the at least one first tooth, passes through the grooves at both sides of the one of the at least one first tooth, is wound on one of the at least one second tooth, passes through the grooves at both sides of the one of the at least one first tooth, and is wound on one of the at least one third tooth.

2. The stator assembly according to claim 1, wherein:
the windings comprise a first winding, a second winding and a third winding;
the plurality of tooth parts form a plurality of tooth part groups;
the first winding, the second winding and the third winding are respectively wound on a respective tooth part group;
each tooth part group comprises a respective first tooth, and the first teeth of the plurality of tooth part groups are arranged adjacently; and
wherein, after a winding of the crossover line in the groove located at a starting end of the first winding is cut off, a first tap is led out from the starting end of the first winding and an end of the second winding; after the winding of the crossover line in the groove located at a starting end of the second winding is cut off, a second tap is led out from the starting end of the second winding and an end of the third winding; and after the winding of the crossover line in the groove located at a starting end of the third winding is cut off, a third tap is led out from the starting end of the third winding and an end of the first winding.

3. The stator assembly according to claim 2, wherein:
the groove comprises a first groove and a second groove located on both sides of the tooth part in a circumferential direction of the stator core, the tooth part group further comprises a second tooth and a third tooth, the second teeth in the plurality of tooth part groups are arranged adjacently, and the third teeth in the plurality of tooth part groups are arranged adjacently; and
wherein the first winding, the second winding and the third winding are wound from the first groove of the corresponding first tooth and form coils on the first tooth, then are wound on the second tooth after lines cross the first groove of the first tooth to form the coils, and are wound on the third tooth by successively passing through crossover lines of the second groove of the first tooth and the first groove of the first tooth after lines cross the end of the second tooth to form the coil, wherein the windings are wound from the second groove of the third tooth and led out by the second groove of the third tooth.

4. The stator assembly according to claim 3, wherein the first winding, the second winding and the third winding have the same plurality of coil turns.

5. The stator assembly according to claim 3, wherein:
the plurality of coils of the first winding, the second winding and the third winding are uniformly distributed in the circumferential direction of the stator core; and
the plurality of coils of the first winding, the second winding and the third winding are successively arranged at intervals.

6. The stator assembly according to claim 2, wherein the first tap, the second tap and the third tap are located at the same end of the stator core.

7. The stator assembly according to claim 1, further comprising an insulation skeleton being arranged at the end of the stator core,
wherein the winding is adapted to be wound on the insulation skeleton, so that the winding crosses a line at the end of the stator core.

8. A motor comprising the stator assembly according to claim 1.

9. The motor according to claim 8, further comprising a rotor assembly rotatably connected with the stator assembly, wherein the rotor assembly comprises a rotor core and a permanent magnet, a permanent magnet slot is arranged on the rotor core, and the permanent magnet is arranged in the permanent magnet slot.

10. A compressor comprising the motor according to claim 8.

11. A refrigeration device comprising the compressor according to claim 10.

\* \* \* \* \*